Sept. 25, 1962   W. E. CURRIE   3,055,684
FLARELESS TUBE COUPLING
Filed Sept. 1, 1959

INVENTOR.
WILLIAM E. CURRIE
BY
Oberlin, Maky & Donnelly
ATTORNEYS

United States Patent Office 3,055,684
Patented Sept. 25, 1962

3,055,684
FLARELESS TUBE COUPLING
William E. Currie, Cleveland, Ohio, assignor to Parker-Hannifin Corporation, Cleveland, Ohio, a corporation of Ohio
Filed Sept. 1, 1959, Ser. No. 837,528
2 Claims. (Cl. 285—342)

The present invention relates generally as indicated to a flareless tube coupling, and more particularly to a flareless tube coupling of the type that employs a contractible ferrule arranged to grip a tube therewithin at plural axially spaced zones, one such zone being primarily a tube seal and pull-out resistor created by contraction of a portion of the ferrule into holding and sealing engagement with the tube and another such zone being primarily a vibration isolator to prevent vibrations of the tube from reaching the tube holding and sealing zone.

It is a principal object of this invention to provide a flareless tube coupling of the character indicated in which the ferrule thereof has a tube sealing and gripping portion at one end and a weakened, radially collapsible grooved section intermediate its ends which is flanked by strong and rigid peripheral ribs and which is effective, upon application of axial compression forces on the ferrule, to provide a vibration isolator that is axially spaced from the tube sealing and gripping portion.

It is another object of this invention to provide a flareless tube coupling of the character indicated in which the ferrule thereof has tube sealing and gripping portions at its opposite ends and a weakened, radially collapsible grooved section at the middle which is flanked by strong and rigid peripheral ribs and which is effective, upon application of axial compression forces on the ferrule to provide a vibration isolator that is axially spaced from that gripping portion that confronts a wedge or cam surface formed in one of the coupling members, the ferrule herein being reversible end for end so that either gripping portion may confront the cam surface aforesaid while the axial compression forces are exerted on the rib that is axially outward of the grooved middle section.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
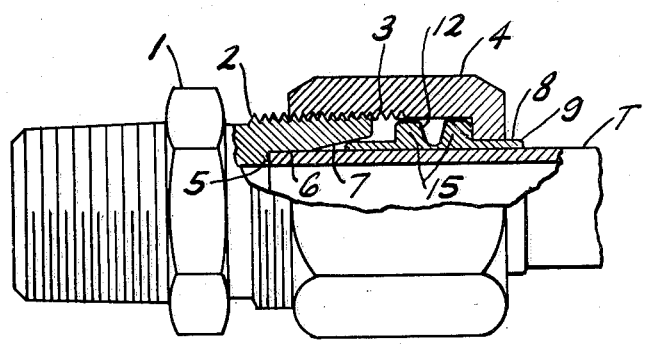
Figure 2:
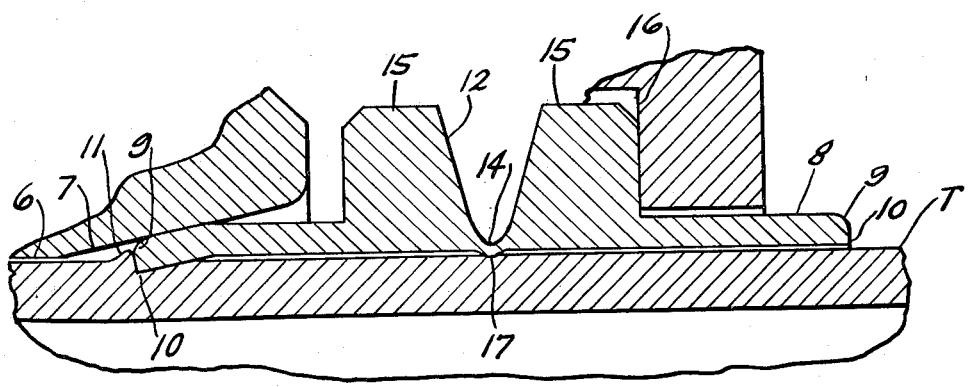

In said annexed drawing:

FIG. 1 is a side elevation view, partly in cross-section, showing the present flareless tube coupling assembly in finger-tight condition; and FIG. 2 is a fragmentary cross-section view on enlarged scale showing how the gripping portion of the ferrule is contracted into holding and sealing contact with the tube and how the grooved intermediate section thereof is contracted into firm vibration-resisting contact with the tube.

In the coupling assembly shown in the drawings there is a coupling body member 1 formed with external threads 2 for engagement with the internal threads 3 of a coupling nut member 4. The body member 1 is formed with an abutment shoulder 5 for the end of a tube T, and with a tube guide bore 6 terminating in a flare mouth 7, the latter constituting, as hereinafter explained, a cam or wedge surface to effect radial contraction of that end of the tube-embracing ferrule or sleeve 8 which confronts said flare mouth 7.

The ferrule 8 herein is reversible so that either of its duplicate ends may be inserted in the flare mouth 7 of the body 1. Thus, the fitting assembler needs only to slip the nut 4 and ferrule 8 onto the tube T (either end of the ferrule first), insert the tube into the body 1 against shoulder 5, and screw the nut 4 tightly on the body 1. To prevent gouging of the flare mouth 7 when the ferrule 8 is forced axially inwardly of the body 1, the external corners 9 of the ferrule 8 are rounded as shown, and moreover, as the ferrule 8 moves axially there is a burnishing action of the corner 9 with the flare mouth 7 whereby a fluid-tight seal is obtained without necessity of providing an extremely smooth surfaced flare mouth. The inner corners 10 of the ferrule 8 are preferably sharp as shown so that as the inserted end of the ferrule is advanced axially and is cammed radially inwardly by the flare mouth 7, the sharp corner 10 at that end bites into the surface of the tube T and plows up a holding ridge 11 (see FIG. 2). Thus, a fluid-tight seal is formed between the ferrule 8 and the tube T and the tube is firmly held by ridge or shoulder 11 from being pulled out of the body 1 or from being blown out by fluid pressure.

The ferrule 8 is formed with a thick and rigid center section which is peripherally grooved as at 12 to leave a weakened, readily collapsible section 14. The bottom of the groove 12 is preferably rounded as shown and is flanked by the sides of the strong and rigid peripheral ribs 15; 15, which are slightly beveled as shown to make it easy to produce a smooth finish in the whole groove. In ferrules 8 for ½" and ¾" diameter tubes T the sections 14 are preferably of thickness at the thinnest point on the order of .006"–.010" and .008"–.012" respectively.

When one end of the ferrule 8 is inserted into the body 1 against flare mouth 7, the axially outer rib 15 is in a position to be engaged by the complemental shoulder 16 of the nut 4. Accordingly, when the nut 4 is tightened as shown in FIG. 2, the axial compression forces on the ferrule 8 cause the inserted end of the ferrule 8 to be axially advanced and contracted into sealing engagement with flare mouth 7 and into sealing and gripping engagement with the tube T. Such compression forces also cause radial inward collapse or deformation of the grooved section of the ferrule 8 whereby the rib 17 formed as a consequence of such deformation firmly engages the tube T at a zone axially spaced from the tube sealing and gripping zone and thus precludes tube vibrations from reaching the latter zone.

It has been discovered that when the weakened section 14 is deformed as aforesaid to form the vibration-isolating rib 17, the surface of the rib 17 will have an "orange peel" or roughened appearance which firmly grips the tube T by its pronounced localized tendency to seize or gall on the tube T. Yet another noteworthy feature of the present invention resides in the thinness of the section 14 which causes the rib 17 to be of varying radial depth around its inner periphery. Thus, the tube T is gripped with higher pressure at a plurality of circumferential spaced zones than at alternating zones between the high pressure zones. This has been found desirable in order to promote the aforesaid seizing or galling action and to prevent formation of a continuous high stress concentration line around the tube T. One explanation for such non-uniform depth of rib 17 may be that in the manufacture of the ferrule 8 it is impossible, as a practical matter, to make the ferrule bore, and groove 12 perfectly round and concentric, and similarly the end faces of the ribs 15; 15 and the nut shoulder 16 may not be perfectly flat and parallel. Therefore, an eccentricity of as little as .001" may result in a 40% variation in the wall thickness at groove 12 with the wall thickness being .005" on one side and .007" on the opposite side. The collapsing of the weakened center section starts at the weakest point and progresses to contact the tube T and to tend to displace the tube T laterally. This sets up added opposition to continued collapse at the weakest zone whereupon additional collapsing at a greater rate progresses at a thicker section, etc. until in the finally assembled condition of the coupling assembly there are circumferential areas of the rib 17 that are of greater radial depth than in between areas. The deeper portions of rib 17 have greater "orange peel" appearance; hence greater "cold welding" or seizing to provide an increased grip on the tube T. Such increased grip in addition to its vibration isolating characteristics serves to prevent pull-out strains on the tube T from imposing strains at the zone of the ridge 11.

Although the ferrule 8 herein may be made from various metals or alloys, usually harder than the tube metal, it is preferred to employ stainless alloys that are noted for their great strengths and work-hardening properties. Also such alloys tend to create a greater "orange peel" effect on the surface of rib 17. The axially inner rib 15 constitutes a positive stop which engages the end of the body 1 if the nut 4 is tightened more than the usual amount. Therefore, excessive take-up is prevented when the axially inner rib 15 engages the end of the body 1. This stop also prevents excessive collapse of the inserted end of the ferrule 8. Further tightening will cause a minor increase in collapse of section 14; however, the great increase in torque is readily apparent even to the unskilled operator and signals him to discontinue tightening.

Other modes of applying the principle of the invention may be employed, change being made as regards the details described, provided the features stated in any of the following claims, or the equivalent of such, be employed.

I therefore particularly point out and distinctly claim as my invention:

1. In a flareless tube coupling, the combination of a pair of threadedly engaged members of which one member has a tube receiving cavity with an abutment stop for the end of the line, said members defining therebetween an annular chamber that includes axially spaced end walls constituted by the respective members and of which at least one is a frusto-conical wedge surface; and a tubular ferrule of metal similar to that of the tube in such chamber having one end thereof confronting said wedge surface so as to be radially contracted thereby into sealing engagement with a tube positioned within said ferrule and against said abutment stop when said ferrule is moved axially against said wedge surface, said ferrule being formed with a radially thickened rigid portion engaged with said other end wall whereby said ferrule is thus moved axially with respects to the tube upon screwing together of said members, said ferrule also being formed with a relatively deep peripheral groove which leaves but a very thin weakened tubular section of radial thickness in the vicinity of $1/50$ to $1/100$ of the outside diameter of the tube, and which is adjacent to said thickened portion, said weakened tubular section, upon screwing together of said members, collapsing radially inwardly to form a tube-contacting rib at a region spaced axially from such one end of said ferrule and also spaced axially from the end of said thickened rigid portion that is engaged by said other end wall, said tube-contacting rib, as an incident of collapsing of said weakened tubular section, having a tube-contacting surface of "orange peel" like appearance which tends to seize or gall on the surface of the tube in the nature of a cold weld with said rib and tube in nascent metal-to-metal contact as said rib is caused to slide axially along the surface of the tube as the is held against the stop and as such one end of said ferrule is radially contracted into sealed engagement with the tube.

2. The flareless tube coupling of claim 1 wherein said ferrule has another radially thickened rigid portion located between said one end of said ferrule and said weakened tubular section of said ferrule and adjacent to the latter.

References Cited in the file of this patent
UNITED STATES PATENTS

| 2,287,889 | Krumsiek | June 30, 1942 |
| 2,381,554 | Norgren | Aug. 7, 1943 |

FOREIGN PATENTS

| 391,140 | Great Britain | Apr. 18, 1933 |
| 749,395 | Great Britain | May 23, 1956 |